United States Patent [19]

Nash

[11] Patent Number: 4,811,270

[45] Date of Patent: Mar. 7, 1989

[54] MERGED CCD/MOS INTEGRATED CIRCUIT

[75] Inventor: James G. Nash, Los Angeles, Calif.

[73] Assignee: Hughes Aircraft Company, Los Angeles, Calif.

[21] Appl. No.: 788,305

[22] Filed: Oct. 17, 1985

[51] Int. Cl.[4] .......................... G06F 7/52; G06F 7/16; G06F 7/00

[52] U.S. Cl. .................... 364/760; 364/767; 364/841; 364/862

[58] Field of Search ............... 364/757, 760, 862, 767, 364/841, 754

[56] References Cited

U.S. PATENT DOCUMENTS

| | | | |
|---|---|---|---|
| 4,032,767 | 6/1977 | Lagrado | 364/862 |
| 4,446,532 | 5/1984 | Baertsch et al. | 364/862 |
| 4,464,728 | 8/1984 | Nash | 364/786 |
| 4,523,290 | 6/1985 | Hyatt | 364/862 |
| 4,625,293 | 11/1986 | Vogelsing et al. | 364/841 |
| 4,638,449 | 1/1987 | Frey | 364/760 |
| 4,646,257 | 2/1987 | Essig et al. | 364/760 |
| 4,665,500 | 5/1987 | Poland | 364/760 |

OTHER PUBLICATIONS

W. Bucklen et al., "Single-chip Digital Multipliers Form Basic DSP Building Blocks," Electron Device News, Apr. 1, 1981, pp. 153-163.
T. A. Zimmerman et al., "Digital Charge-Coupled Logic (DCCL)," IEEE J. Solid State Circuits, Oct. 1977, pp. 473-485.
J. G. Nash, "An 8-Bit Parallel CCD Digital Multiplier," Proceedings of IEEE Custom Integrated Circuits Conference, Rochester, N.Y., May 17-19, 1982.
Dawson et al, "A CMOS/Buried-n-channel CCD Compatible Process for Analog Signal Processing Applications", RCA Review, vol. #38, #3, pp. 406-435, Sep. 1977.

Primary Examiner—Gary V. Harkcom
Assistant Examiner—Dale M. Shaw
Attorney, Agent, or Firm—V. D. Duraiswamy; A. W. Karambelas

[57] ABSTRACT

A digital integrated circuit that includes on a common substrate both charge-coupled device (CCD) circuitry and metal-oxide semiconductor (MOS) circuitry that combine together efficiently to implement a complex digital function such as a multi-bit multiplier or divider. The CCD circuitry includes an array of full adder cells and the MOS circuitry selectively processes and channels certain bits of a plurality of digital input bits to the individual full adder cells, such processing being based on other of the digital input bits. The introduction of MOS logic into the CCD circuit permits greater flexibility in the layout and interconnection of the individual full adder cells and permits the utilization of more efficient algorithms than otherwise could be used in circuits having CCD elements alone.

8 Claims, 3 Drawing Sheets

MERGED CCD/MOS INTEGRATED CIRCUIT

BACKGROUND OF THE INVENTION

This invention relates generally to charge-coupled device (CCD) integrated circuits, and, more particularly, to CCD circuits that include an array of full adder cells useful, for example, in implementing multi-bit digital multipliers or dividers.

CCDs have established themselves as a technology with low power consumption and high packing density for both analog and digital applications. However, CCDs have not gained widespread acceptance as a viable digital technology, in part because they are not generally considered to be well adapted for the efficient implementation of complex circuits such as multi-bit multipliers and dividers.

Attempts have been made in the past to produce pipelined carry-save multipliers utilizing CCD technology alone. The multipliers have included an array of full adder cells, one suitable version of which is described in U.S. Pat. No. 4,464,728, issued to James G. Nash and entitled "Charge Coupled Device Ripple Adder with Nearly Instantaneous Carry Propagation." Although such a CCD digital multiplier achieves high throughput per unit power and is relatively small in size, it is not believed to be as small in size as is possible. Significantly, more than one-half of the multiplier's total area is occupied by CCD delay circuitry that coordinates the arrival of bits at each of the multiplier's successive logic stages.

Accordingly, there is a need for a complex CCD integrated circuit such as a pipelined digital multiplier or divider that is even more efficient than those previously available. In particular, there is a need for such a CCD circuit that can perform the same function as has been performed by CCD circuits in the pass, but with a reduced total size and complexity. The present invention fulfills this need.

SUMMARY OF THE INVENTION

The present invention is embodied in a digital integrated circuit that includes on a common substrate both charge-coupled device (CCD) means and metal-oxide semiconductor (MOS) means that combine together to implement a complex digital function such as a multi-bit multiplier or divider. The CCD means includes a plurality of full adder cells arranged in a two-dimensional array of sequential stages, and the MOS means selectively processes certain bits of a plurality of digital input bits and channels them to multiple stages of the array of full adder cells. The introduction of MOS logic into the CCD circuit permits greater flexibility in the layout and interconnection of the individual full adder cells and permits the utilization of more efficient algorithms than otherwise could be used in circuits having CCD elements only.

One principal circuit application of the invention is in the implementation of a multi-bit parallel multiplier. This circuit multiplies together a multi-bit multiplier and a multi-bit multiplicand, to produce a multi-bit product. The plurality of full adder cells in the CCD means form a sequentially-operable rectangular array, with each row of the array adding a prescribed multi-bit word to the multi-bit sum from the previous row of the array. This produces a new multi-bit sum that is summed in the next succeeding row of the array.

The multi-bit parallel multiplier embodiment of the invention can advantageously utilize the well-known Booth's algorithm, which produces a multi-bit product with minimum delays. Here, the MOS means selectively delays and processes the multi-bit multiplicand and channels a prescribed multi-bit word based on the multiplicand to each row of the full adder array. The nature of each such prescribed multi-bit word is determined in accordance with particular bits of the multi-bit multiplier. The prescribed words channeled to the successive rows of the array are either (1) the multiplicand shifted by one bit, (2) the complement of the multiplicand shifted by one bit, (3) the multiplicand itself, (4) the complement of the multiplicand, or (5) a word containing all zero bits.

Another application of the present invention is as a multi-bit parallel divider, which divides a multi-bit dividend by a multi-bit divisor, to produce a multi-bit quotient. This embodiment is similar to the multiplier embodiment, except that each full adder cell in the full adder array is arranged to subtract rather than add. Thus, each row in the full adder array subtracts a prescribed multi-bit word from the multi-bit difference produced by the preceding row in the array. Each prescribed multi-bit word is determined in accordance with particular bits of the multi-bit divisor.

One primary advantage of the present invention is that the presence of the MOS means to channel prescribed words to the CCD means permits the CCD means to be arranged on the substrate such that all of the charge paths interconnecting its constituent full adder cells do not cross over each other. This obviates a difficult problem of properly handling overlaying charge paths that sometimes can be encountered in the CCD circuits of the prior art.

Other aspects and advantages of the present invention will become apparent from the following description of the preferred embodiment, taken in conjunction with the accompanying drawings, which illustrate, by way of example, the principles of the invention.

DESCRIPTION OF THE PREFERRED EMBODIMENTS

With reference now to the drawings, there are shown two embodiments of a merged charge-coupled device (CCD)/metal-oxide semiconductor (MOS) integrated circuit that can perform complex arithmetic functions significantly more efficiently than prior circuits using CCD or MOS technology alone. The circuit takes advantage of the low power and high density of CCDs and, at the same time, utilizes the versatility of MOS technology to facilitate the interconnection of the CCD elements in such a way that complex arithmetic operations can be performed with increased efficiency.

Figure 1:
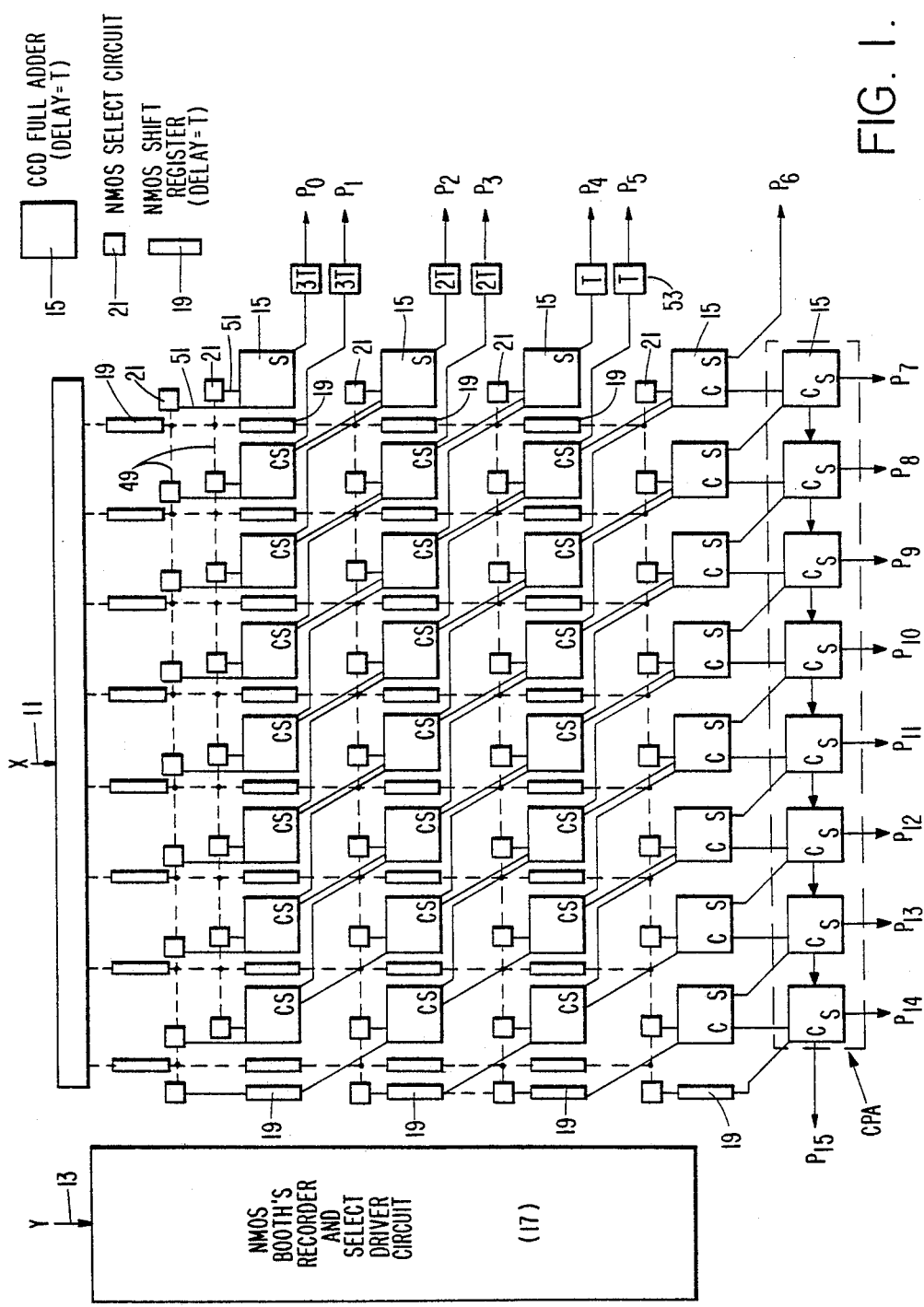
FIG. 1 is a simplified block diagram of an eight-bit parallel digital multiplier embodying the present invention.

With particular reference to FIG. 1, there is shown an eight-bit parallel radix-four digital multiplier circuit that multiplies together an eight-bit multiplicand, designated X, and an eight-bit multiplier, designated Y, which are supplied to the circuit on lines 11 and 13 respectively. The circuit produces a 16-bit product, designated $P_0$ through $P_{15}$, that is output on 16 separate lines. The circuit performs its multiplication function using both CCD and NMOS logic circuitry.

The multiplier's CCD circuitry includes a plurality of full adder cells 15 that are arranged in an array of five sequential rows of eight full adder cells each. Each row adds together two eight-bit words that are determined only after the previous row has completed its addition operation.

The multiplier's NMOS circuitry functions principally to channel particular digital words to each row of CCD full adder cells 15 for summing. This NMOS circuitry includes a Booth's recoder and select driver circuit 17, an array of one-bit delay shift registers 19, and an array of select circuits 21.

The NMOS shift registers 19 are arranged in four rows of eight registers each and function to delay the eight-bit multiplicand so as to synchronize its arrival at the successive rows of full adder cells 15 with the arrival of eight-bit sums from the previous full adder rows.

The select circuits 21 are similarly arranged in rows that are associated with the rows of full adder cells 15. As will be described below, each select circuit channels a selected bit from the NMOS shift registers 19 to one input of an associated full adder cell. The identity of this bit is determined by the Booth's recoder 17, based on particular bits of the eight-bit multiplier.

The multiplier circuit of FIG. 1 implements the well-known radix-four Booth's algorithm, which is an efficient technique for multiplying together two parallel digital words. The NMOS Booth's recoder and select drive circuit 17 examines groups of bits in the eight-bit multiplier and, based on those bits, couples appropriate control signals on lines (not shown) to the various NMOS select circuits 21. In response, these select circuits channel appropriately processed versions of the eight-bit multiplicand to the successive rows of the full adder array. In particular, each row of select circuits channels to its corresponding row of full adders one of five processed versions of the eight-bit multiplicand: (1) the multiplicand multiplied by 2 (i.e., the multiplicand shifted one bit to the left), (2) the complement of the multiplicand multiplied by 2 (i.e., the complement of the multiplicand shifted one bit to the left), (3) the multiplicand itself, (4) the complement of the multiplicand itself, and (5) an eight-bit word containing all zeroes. As previously mentioned, the particular one of these five possible words is determined by the Booth's recoder circuit 17 in accordance with Booth's algorithm.

Figure 2:
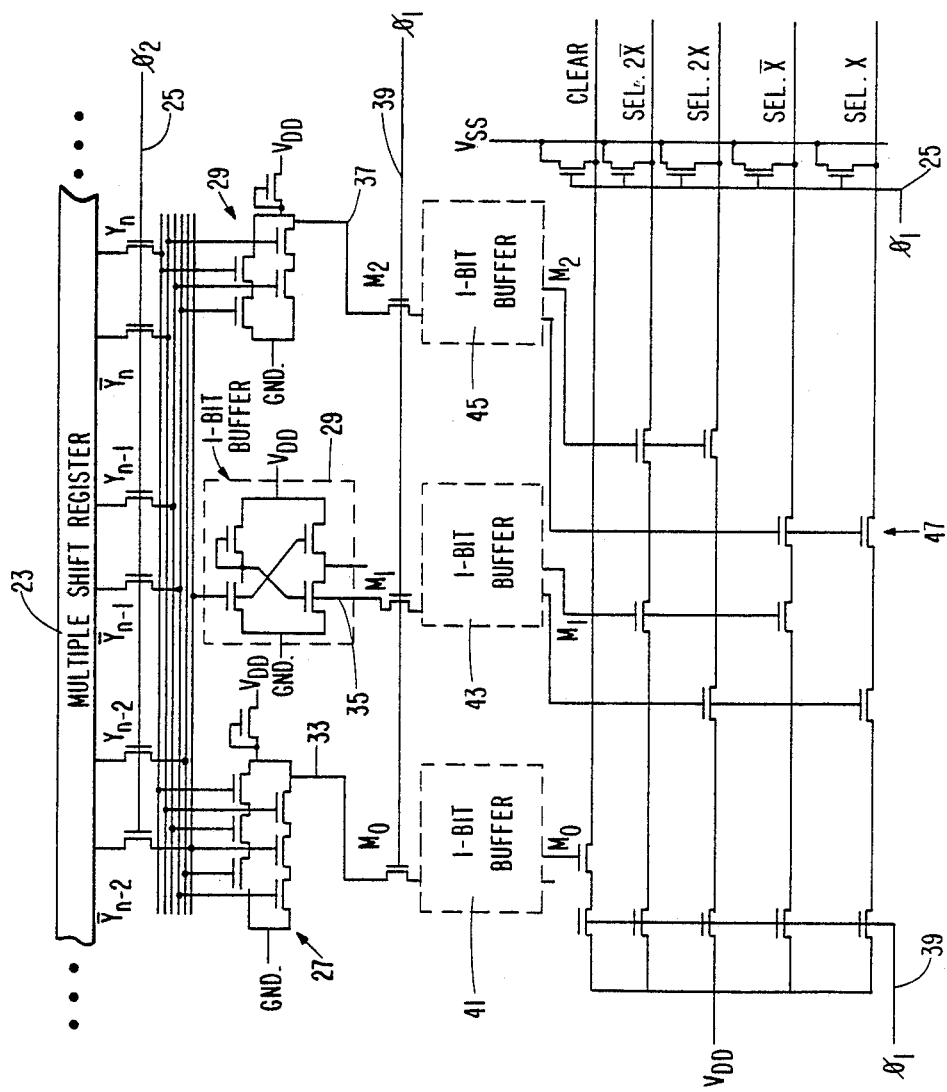
FIG. 2 is a schematic diagram of one stage of the Booth's recoder and select driver circuit of the multiplier of FIG. 1.

FIG. 2 depicts one stage of the multi-stage NMOS Booth's recoder and select driver circuit 17 of FIG. 1. The depicted stage examines three bits of the eight-bit multiplier. i.e., bits $Y_n$, $Y_{n-1}$, and $Y_{n-2}$, and their respective complements, and, based on these bits, produces five control signals for conditioning one particular row of the select circuits 21 to channel a prescribed one of the five possible eight-bit words to the corresponding row of full adder cells 15.

The three bits $Y_n$, $Y_{n-1}$ and $Y_{n-2}$ are initially loaded into a multiplier shift register 23 and, from there, clocked by a clock signal $\phi_2$ supplied on line 25 into gate arrays 27 and 29 and a one-bit buffer 31. These devices suitably AND together and delay the specific multiplier bits, to produce three control signals, designated $M_0$, $M_1$ and $M_2$, output on lines 33, 35 and 37, respectively.

The three control signals are, in turn, clocked by a clock signal $\phi_1$ supplied on line 39 through one-bit buffers 41, 43 and 45, respectively, to a MOSFET switch array indicated generally by the reference numeral 47. Under the control of the same clock signals $\phi_1$ and $\phi_2$, this switch array produces the five control signals coupled to the corresponding set of select circuits 21. As previously mentioned, these five control signals condition the select circuits to channel to the corresponding row of the full adder cells either the shifted multiplicand of its complement, the multiplicand itself or its complement, or an eight-bit zero word. Each of the five control signals selects a particular one of these five alternatives.

With reference again to FIG. 1, each select circuit 21 receives from a particular pair of shift registers 19 two bits of the eight-bit multiplicand. These bits are supplied to the select circuit on the dotted lines 49. Depending upon the status of the five control signals, the select circuit then outputs a particular one of the two input bits, their respective complements, or zero, for coupling on line 51 to the corresponding full adder cell 15. This select circuit can be implemented using any suitable NMOS circuit.

Each full adder cell 15 can be implemented efficiently as a CCD circuit. One suitable full adder cell is disclosed in U.S. Pat. No. 4,464,728, issued to James G. Nash and entitled "Charge Coupled Device Ripple Adder with Nearly Instantaneous Carry Propagation." The disclosed full adder cell adds together two input bits and a carry bit, to produce a sum and carry bit.

The first row of CCD full adder cells 15 performs the initial arithmetic operation. It sums together a pair of eight-bit words selected by two corresponding rows of select circuits 21, with each full adder cell producing a sum bit and a carry bit. The sum bits from the two least significant full adder cells form the two least significant bits $P_O$ and $P_1$ of the computed product. The sum bits from the remaining six full adder cells are transferred to the six least significant cells of the next full adder row. This is the same effect as having the next full adder row skewed two positions to the left.

The carry bits from all but the least significant full adder cell 15 in the first row are transferred to the seven least significant cells of the next full adder row. The eighth, i.e., most significant, cell in the next row receives as an input a bit from the NMOS shift register 19 that has been delayed by an amount corresponding to the delay through the first row of full adder cells.

The second, third and fourth rows of the full adder array all sum together the sum and carry bits transferred to them from the respective previous row as well as the particular new eight-bit words supplied to them by the corresponding rows of select circuits 21. These latter words, it will be recalled, are all based of the appropriately delayed eight-bit multiplicand.

Each of the second, third and fourth full adder rows produces eight sum and carry bits. The two least significant sum bits of the second and third rows are output as product bits $P_2$ and $P_3$ and $P_4$ and $P_5$, respectively, while the single least significant sum bit of the fourth row is output as product bit $P_6$.

As with the first row of full adder cells 15, the second and third rows transfer the remainder of their respective sum and carry bits to the next succeeding row, skewed two and one positions to the right, respectively.

The fifth and final row of full adder cells 15 functions as a carry propagate adder, which suitably combines the sum and carry bits of the fourth full adder row. The sum bits output by this final row are output as product bits $P_7$ through $P_{14}$, and the carry bit of the most significant cell in the row is output as product bit $P_{15}$. This row of full adder cells can be implemented conveniently as described in U.S. Pat. No. 4,464,728 discussed above.

As previously mentioned, each stage of the full adder array introduces an additional time delay. So as to synchronize the 16 product bits $P_0$ through $P_{15}$ produced by the successive stages, the multiplier circuit further includes six delay circuits 53. Two of the delay circuits delay $P_0$ and $P_1$, which are output by the first full adder stage, by three clock periods. Similarly, the four remaining delay circuits delay $P_2$ and $P_3$ by two clock periods and $P_4$ and $P_5$ by one clock period. The product bits $P_6$ through $P_{15}$ are all produced substantially simultaneously, coinciding with the presence of $P_0$ through $P_5$ at the output terminals of their respective delay circuits.

It will be appreciated that, because the multiplier circuit implements an algorithm that is radix-four, each full adder stage performs the equivalent function of two full adder stages in more conventional algorithm implementations. Thus, each of the preliminary full adder stages produces two product bits. This efficiency is facilitated by the Booth's recoder and select driver circuit 17, which examines at any one time not one but several bits of the eight-bit multiplier.

All of the circuit elements of FIG. 1 are suitably clocked to sequence the flow of bits. Each full adder cell 15, for example, requires four clock signals for performing each addition operation. Those skilled in the art of CCD and/or MOS circuit design will, of course, appreciate the need for such clock signals and know of numerous techniques for generating them.

It will be appreciated that the multiplier circuit of FIG. 1 is particularly adapted for use as a pipelined device. That is, a new pair of eight-bit multiplier and multiplicand words can be input to the circuit during each clock cycle. Thus, at any one time, a separate multiplicand is stored in each row of NMOS shift registers 19 for processing in the associated rows of select circuits 21 and full adder cells 15.

It will be observed in FIG. 1 that none of the paths followed by the charge packets as they are transferred from one CCD full adder cell 15 to another cross over each other. The only instances where signal paths must cross over each other involves NMOS conductors, which present no significant design difficulties at all. Such conductors can simply pass beneath the surface carrying the CCD charge packets. This design feature greatly simplifies the integrated circuit's layout and enables implementation of Booth's algorithm, as described above.

Figure 3:
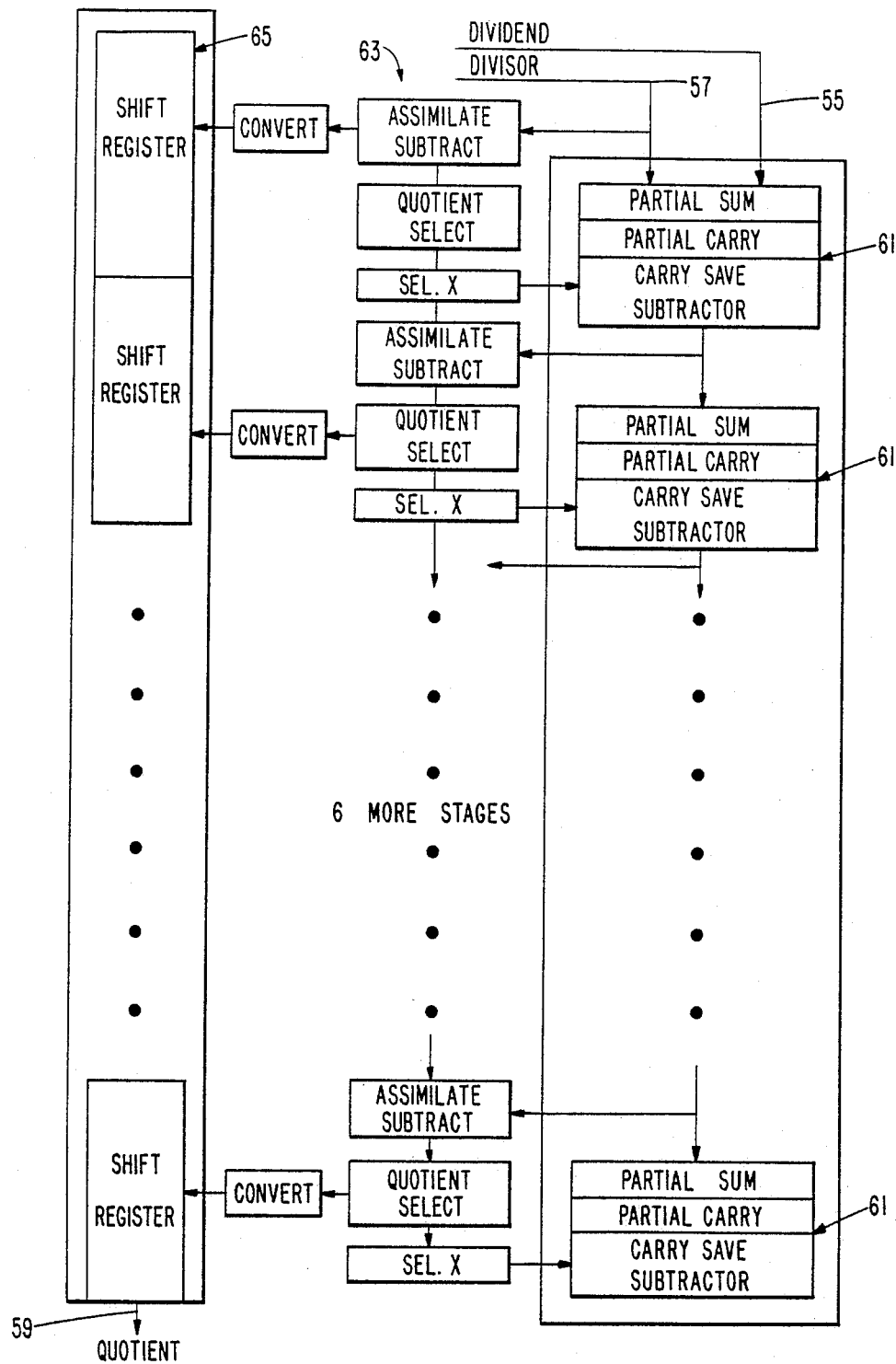
FIG. 3 is a simplified block diagram/flow chart of an eight-bit parallel digital divider embodying the present invention.

FIG. 3 is a simplified block diagram/flow chart of a portion of a pipelined CCD/MOS radix-4 eight-bit divider circuit. The circuit divides an eight-bit dividend supplied on lines 55 by an eight-bit divisor supplied on lines 57, to produce an eight-bit quotient output on lines 59.

The divider circuit implements an algorithm similar to Booth's algorithm implemented by the multiplier circuit of FIG. 1. The divider circuit includes a sequence of CCD full adder (subtractor) stages 61, each of which receives as inputs both an eight-bit partial remainder word from the previous stage and a prescribed eight-bit word supplied to it by associated NMOS or CMOS circuitry 63. These prescribed eight-bit words are based on the eight-bit dividend and are derived in accordance with particular bits of the eight-bit divisor.

Each CCD full adder (subtractor) stage 61 generates one quotient bit and a partial remainder. The MOS circuitry 63 converts the quotient bit into a standard two's complement form and loads it into a CCD shift register 65 for storage. The partial remainder, which includes both partial sums and partial carries, is transferred to the next CCD full adder (subtractor) stage 61 for a subsequent subtraction operation. After the last of the eight quotient bits has been loaded into the CCD shift register, all eight bits are output simultaneously as the eight-bit quotient on line 59.

As with the multiplier circuit of FIG. 1, the divider circuit of FIG. 3 has a pipelined structure such that numerous separate division operations can be performed simultaneously. At the end of each clock period, the bits associated with a given operation are moved to the next succeeding stage.

It should be appreciated from the foregoing description that the present invention provides a merged CCD/MOS integrated circuit that can perform complex arithmetic functions significantly more efficiently than prior circuits using CCD or MOS technology alone. The CCD portion of the circuit includes an array of full adder cells, while the MOS portion of the circuit channels selected bits to the individual full adder cells. This combination takes advantage of the low power and high density of CCDs and, at the same time, utilizes the versatility of MOS technology to facilitate the interconnection of the CCD elements in such a way that complex arithmetic operations can be performed with increased efficiency.

Although the invention has been described in detail with reference to the presently preferred embodiments, those skilled in the art will appreciate that various modifications can be made without departing from the invention. Accordingly, the invention is limited only by the following claims.

I claim:

1. An integrated circuit for providing multi-bit parallel multiplication or multi-bit parallel division, comprising:
    a substrate;
    digital input means located on the substrate for receiving a plurality of digital input bits to be processed by the integrated circuit;
    charge-coupled device means located on the substrate and including a plurality of full adder cells arranged in a two-dimensional array of sequential stages, with sum and carry output bits from each stage being channel to predetermined full adder cells of the next sequential stage, if any;
    metal-oxide semiconductor means located on the substrate for selectively channeling certain of the digital input bits to multiple stages of the two-dimensional array of full adder cells in accordance with other of the digital input bits; and
    digital output means located on the substrate for outputting a plurality of digital output bits produced by the plurality of full adder cells.

2. An integrated circuit as defined in claim 1, wherein:
    the integrated circuit is a multi-bit parallel multiplier;
    the digital input means receives a multi-bit multiplier and a multi-bit multiplicand; and the plurality of full adder cells in the charge-coupled device means form a rectangular array, with each row of the array adding a prescribed multi-bit word to the multi-bit sum from an adjacent row of the array, to produce a new multi-bit sum.

3. An integrated circuit as defined in claim 2, wherein:
the multi-bit parallel multiplier implements Booth's algorithm; and
the metal-oxide semiconductor means selectively delays and processes the multi-bit multiplicand and channels a corresponding multi-bit word to each row of the full adder array.

4. An integrated circuit as defined in claim 3, wherein the metal-oxide semiconductor means processes the multi-bit multiplicand in accordance with particular bits of the multi-bit multiplier, such that the prescribed multi-bit word channeled to each row of the full adder array is either the multiplicand shifted by one bit, the complement of the multiplicand shifted by one bit, the multiplicand itself, the complement of the multiplicand, or a word containing all zero bits.

5. An integrated circuit as defined in claim 1, wherein:
the integrated circuit is a multi-bit parallel divider;
the digital input means receives a multi-bit dividend and a multi-bit divisor; and
the plurality of full adder cells in the charge-coupled device means form a rectangular array, with each row of the array subtracting a prescribed multi-bit word from the multi-bit difference produced by an adjacent row of the array, to produce a new multi-bit difference.

6. An integrated circuit as defined in claim 1, wherein the charge-coupled device means is arranged such that charge paths interconnecting the plurality of full adder cells do not cross over each other.

7. A parallel radix-4 digital multiplier integrated circuit comprising:
a substrate;
digital input means located on the substrate for receiving a multi-bit multiplier and a multi-bit multiplicand to be multiplier together by the integrated circuit;
a sequential array of charge-coupled device full adder stages located on the substrate, each stage transferring sum and carry bits to the next succeeding stage;
metal-oxide semiconductor recoder means located on the substrate for processing the multi-bit multiplier and generating a plurality of control signals based thereon;
metal-oxide semiconductor selector means, located on the substrate and responsive to the control signals and to the multi-bit multiplicand, for channeling selected bits of the multiplicand to multiple stages of the array of full adder stages;
wherein the full adder stages operate on the selected bits channeled to them and the sum and carry its transferred between successive stages, to produce a multi-bit product;
digital means located on the substrate for outputting the multi-bit product produced by the array of full adder stages; and
wherein the array of full adder stages is arranged such that none of the charge paths interconnecting the individual full adder stage cross over each other.

8. A parallel radix-4 digital multiplier integrated circuit as defined in claim 7, wherein:
the circuit implements Booth's algorithm; and
the prescribed bits channeled by the selector means to the successive full adder stages correspond to at least one of the multiplicand shifted by one bit or its complement, the multiplicand itself or its complement, a word containing all zero bits.

* * * * *

UNITED STATES PATENT AND TRADEMARK OFFICE
CERTIFICATE OF CORRECTION

PATENT NO. : 4,811,270

DATED : March 7, 1989

INVENTOR(S) : J.G. Nash

It is certified that error appears in the above-identified patent and that said Letters Patent is hereby corrected as shown below:

Column 8, line 22, "its" should read --bits--.

Signed and Sealed this

Nineteenth Day of September, 1989

Attest:

DONALD J. QUIGG

Attesting Officer

Commissioner of Patents and Trademarks